(12) United States Patent
Cheng et al.

(10) Patent No.: US 7,756,751 B2
(45) Date of Patent: Jul. 13, 2010

(54) ARCHITECTURE FOR BUSINESS PROCESS INTEGRATION

(75) Inventors: Tsz Simon Cheng, Grand Prairie, TX (US); Ying Huang, Westchester, NY (US); Santhosh Kumaran, Croton On Hudson, NY (US); Amaresh Rajasekharan, Cortlandt Manor, NY (US); Mathews Thomas, Flower Mound, TX (US); Frederick Y. Wu, Cos Cob, CT (US); Yiming Ye, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1835 days.

(21) Appl. No.: 10/715,255

(22) Filed: Nov. 17, 2003

(65) Prior Publication Data

US 2005/0108680 A1 May 19, 2005

(51) Int. Cl.
*G06Q 30/00* (2006.01)
(52) U.S. Cl. .......................................... 705/26; 705/37
(58) Field of Classification Search .................. 705/26, 705/37
See application file for complete search history.

(56) References Cited

U.S. PATENT DOCUMENTS

2004/0162741 A1* 8/2004 Flaxer et al. ................... 705/7

OTHER PUBLICATIONS

A framework-based approach to building private trading exchanges, S Kumaran, Y Huang, J -Y Chung. IBM Systems Journal. Armonk: 2002. vol. 41, Iss. 2; p. 253, downloaded from ProQuest Direct on the Internet on Mar. 24, 2009, 23 pages.*
WebSphere as an e-business server, D F Ferguson, R Kerth. IBM Systems Journal. Armonk: 2001. vol. 40, Iss. 1; p. 25, downloaded from ProQuest Direct on the Internet on Mar. 24, 2009, 29 pgs.*

* cited by examiner

*Primary Examiner*—James Zurita
(74) *Attorney, Agent, or Firm*—Novak Druce + Quigg

(57) ABSTRACT

A software architecture can include an artifact layer and a configuration layer. The artifact layer can contain multiple application independent artifacts. A configuration layer can contain at least one application. The application can include multiple states in which the application executes instructions. The states can exist within execution spaces that are distributed across a network. The application uses artifacts of the artifact layer, which can operate in a state dependent manner.

12 Claims, 5 Drawing Sheets

ARCHITECTURE FOR BUSINESS PROCESS INTEGRATION

BACKGROUND

1. Field of the Invention

The present invention relates to the field of computer software and, more particularly, to business process integration software.

2. Description of the Related Art

The pervasive connectivity of the Internet and the powerful architecture of the World Wide Web are changing many market conventions and creating a tremendous opportunity for conducting business on the Internet. Digital marketplace business models and the advancement of Web related standards are tearing down walls within and between different business entities and business related software applications. Businesses entities and applications are being integrated at all granularities and at all levels from devices, operating systems, and middleware to directory, data, information, application, and business processes. An emerging challenge presented to businesses operating in this environment relates to business process integration (BPI), which entails the integration of all the facets of inter and intra business operations into a unified structure.

Conventional businesses typically define a multitude of business processes and manage these processes using various disjoint software components. Examples of such business processes include processing of product offerings, purchase orders (PO), sales orders, requests for quotes (RFQ), shipment tracking, receipt confirmation, product support, contracts, and the like. The disjoint software components responsible for the business processes can be contained within legacy systems, numerous non-synchronized databases, one or more backend enterprise information systems (EIS), and other loosely coupled computing systems and/or applications. Accordingly, the business processes of conventional businesses are often a complex amalgamation of automated and manual processes that can be costly to utilize, maintain, and upgrade.

Current solutions to the problem of conducting business within a BPI environment contain numerous shortcomings. One conventional approach has been to generate a customized solution for each business entity. For example, a video chain can implement a unique business process integration solution for a multitude of stores. Entity-specific business solutions, however, can be extremely expensive to construct and maintain. Further, entity-specific solutions can require substantial amounts of time to develop, train, install, and implement.

Another problem with customized solutions is the difficulty in upgrading and modifying the customized software. It can be economically unfeasible for small to moderate sized businesses implementing entity-specific BPI solutions to upgrade their solutions in a timely manner to compete with more generalized solutions. That is, software development, upgrade, training, and maintenance costs for generalized solutions can be spread over a much larger customer base, thereby granting generalized solutions substantial competitive advantages. Since technologies, relating to the Internet and electronic commerce are constantly evolving, businesses that are able to keep pace with technological improvements possess an edge within the electronic marketplace. Accordingly, competition can force businesses utilizing Internet-based tools to continuously evolve their Internet tools or to be overshadowed by competing businesses that are quicker to adapt.

SUMMARY OF THE INVENTION

The present invention provides a method, a system, and an apparatus for achieving business process integration (BPI) using a model driven methodology. More particularly, the invention can define a common architecture for BPI that includes a multitude of application independent software building blocks called artifacts. Using the BPI architecture, a BPI application can be rapidly constructed by configuring pre-constructed artifacts to suit the needs of a particular business entity. In one embodiment, software engines can be formed which are capable of processing the artifacts of the BPI architecture, thereby alleviating the need for substantial segments of application specific code that would otherwise be developed and maintained. BPI artifacts can include adaptive documents, processing flows, screen flows, and adapters.

Adaptive documents can be semi-autonomous entities with state-dependant behavior that include data for one or more business objects, such as purchase orders, request for purchases, contracts, and other such documents or forms. Processing flows can include a set of activities relating to the processing of adaptive documents. For example, a process flow can be defined for an electronic commerce transaction, which can involve the conveyance and processing of an adaptive document to multiple business entities and/or multiple applications within the BPI architecture. The screen flows can monitor and facilitate interface interactions within architecture compliant applications. An adaptor can facilitate data conveyance within a distributed environment and can include a transport adaptor and a data adaptor. The transport adapter can translate messages between messaging protocols used by different applications. One or more transport adaptors can establish a communicative link between applications through which adaptive documents can be conveyed. The data adapters can reconcile data formats so that data can be exchanged between different applications.

Numerous advantages can be achieved by implementing applications that adhere to standardized conventions established by the BPI architecture. For example, use of the BPI architecture can substantially reduce the complexity of BPI applications by implementing common functions centrally, thereby alleviating the need for each application to include repetitive application specific code for the common functions. Further, the BPI architecture can enable architecture reuse resulting in repeatable solutions having fewer initial glitches than conventionally implemented solutions. Additionally, the BPI architecture can formalize a variety of identified best business practices into a well-defined methodology.

One aspect of the present invention includes a software architecture including a configuration layer, a template layer, an artifact layer, and/or an element layer. The configuration layer can contain at least one application, where the application can include multiple states in which the application can execute instructions. The states can exist within execution spaces that are distributed across a network. Additionally, the application can include a set of artifacts at least a portion of which execute in a state-dependent fashion. In one embodiment, at least one of the applications can be an electronic commerce application, where different execution spaces defined for the application can be associated with different business entities involved with an electronic commerce transaction. The electronic commerce application can represent a business process integration solution relating to electronic commerce.

The template layer can contain multiple application independent templates, each template can include numerous inter-related artifacts that together define a functionality. The templates can be used to construct at least a portion of the applications of the configuration layer. The artifact layer can contain multiple application independent artifacts. The artifacts can include an adaptive document, a process flow, a screen flow, a data adaptor, and/or a transport adaptor. The element layer can include multiple artifact independent elements, where at least a portion of the artifacts of the artifact layer can be constructed using one or more of the elements.

Another aspect of the present invention can include a system for conducting electronic commerce that can include an architecture, a commerce server, and multiple electronic commerce applications. The architecture can include multiple application independent artifacts. In one embodiment, the architecture can include one or more templates that can establish default values during a construction of the electronic commerce applications. Each template can include a defined set of artifacts.

The artifacts can include an adaptive document, a process flow, an adaptor, and/or a screen flow. The adaptive document can include electronic commerce data. Additionally, the adaptive document can be conveyed among numerous defined states. The functionality of the adaptive document can be dependant upon a state within which the adaptive document is disposed. The process flow can direct the conveyance of at least one of the adaptive documents from one defined state to another defined state responsive to an occurrence of a system event. The adaptor can translate messaging protocols to facilitate a conveyance of at least one adaptive document across a network. The adaptor can also map data from one data structure to another data structure. The screen flow can model interactions occurring within interfaces of the various electronic commerce applications.

In one embodiment, the commerce server can process artifacts in a state dependent fashion. Additionally, the electronic commerce applications can conform to the standards of the architecture. Further, each electronic commerce application can be tailored for at least one particular business entity that conducts electronic commerce. Electronic commerce transactions involving multiple ones of the business entities and multiple electronic commerce applications can be performed by the system. Notably, the commerce server can be utilized during the execution of the electronic commerce transactions.

Yet another aspect of the present invention can include a system for conducting electronic commerce transactions. The system can include multiple applications used by different businesses. Different ones of the applications can be tailored for business processes unique to specific ones of the businesses. Multiple ones of the applications can be utilized to conduct at least one electronic commerce transaction. Further, multiple artifacts can be utilized by the applications to conduct the electronic commerce transactions. The artifacts can be application independent software units. Additionally, the artifacts can include an adaptive document, a process flow, an adaptor, and/or a screen flow.

The system can also include a commerce server configured to coordinate interactions of the artifacts among the applications. The commerce server can include a state engine for managing a multitude of states defined for the electronic commerce transactions. At least a portion of the artifacts can include state-dependant features. The commerce server can further include a development engine containing tools to facilitate construction of the applications. The development engine tools can utilize predefined ones of the artifacts as building blocks for constructing the applications. Additionally, the commerce server can include an administrative graphical user interface and/or an artifact engine.

Still another aspect of the present invention can include a method for conducting an electronic commerce transaction. The method can include the step of initializing an electronic commerce transaction. Commerce data can be inputted into the adaptive document. For example, commerce data can be inputted into an electronic document, converted from a format of the electronic document to a format of an adaptive document using a data adaptor, and the formatted data can be inputted into the adaptive document. Once the data has been inputted, the adaptive document can be conveyed to a different location from the location in which data was inputted. For example, a transport adaptor can be initialized during the conveyance of the adaptive document. In the example, a message transport protocol can be adjusted using the transport adaptor and the adaptive document can be conveyed using the adjusted protocol.

At least one electronic commerce action can be performed upon the adaptive document, where the electronic commerce action can utilize application independent algorithms. For example, a state of the adaptive document can be altered based upon instructions detailed within a process flow. Actions of the adaptive document can be dependent upon a state of the adaptive document. After performing the electronic commerce action, the adaptive document can be conveyed to another location. Data within the adaptive document can be converted from a format of the adaptive document to a format of an electronic document. At least a portion of the electronic document containing the converted data can be presented within an application associated with the location to which the adaptive document was conveyed.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
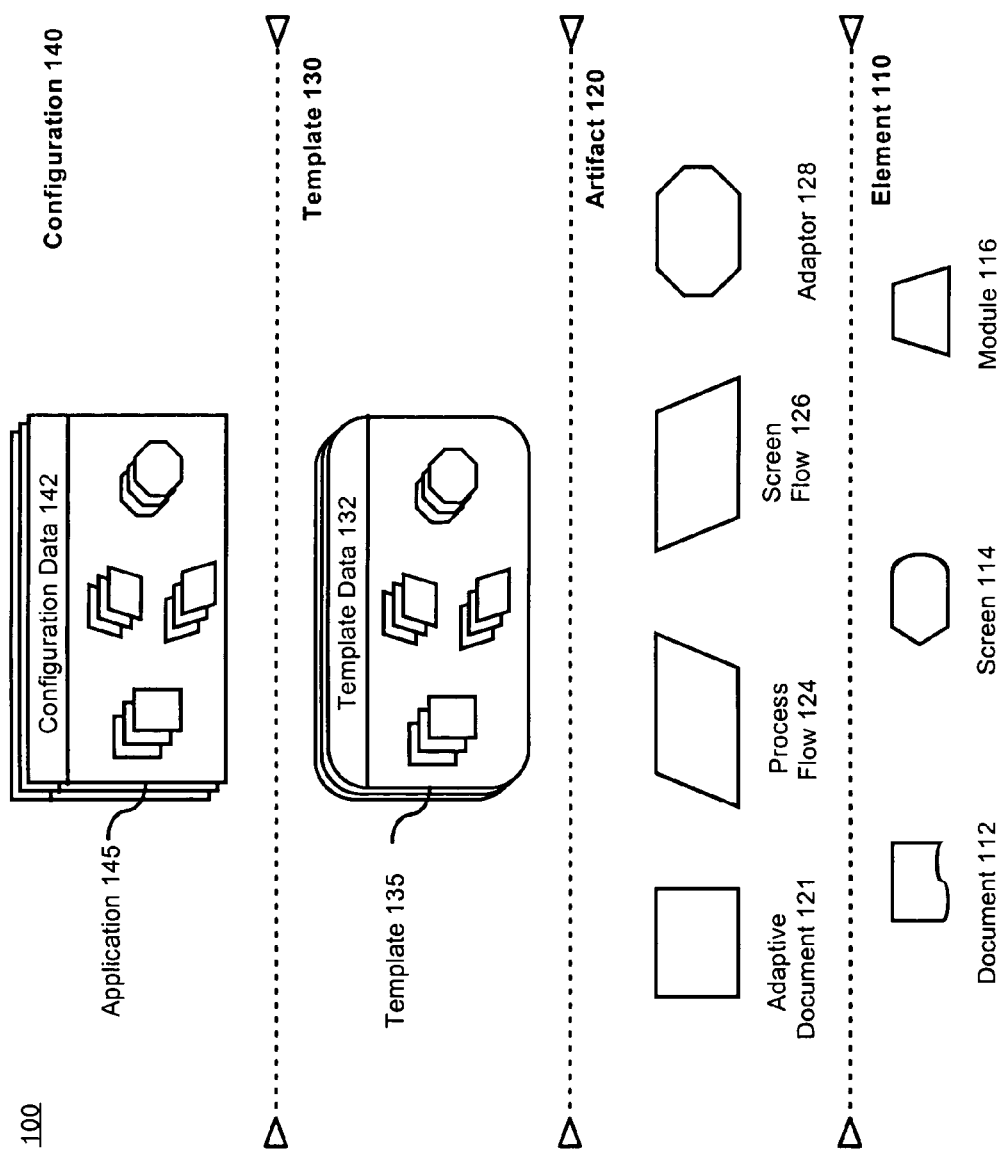
FIG. 1 is a schematic diagram illustrating an exemplary architecture for integrating business processes in accordance with one embodiment of the inventive arrangements disclosed herein.

FIG. 1 is a schematic diagram illustrating an exemplary architecture 100 for integrating business processes in accordance with one embodiment of the inventive arrangements disclosed herein. The architecture 100 can include a configuration layer 140, a template layer 130, an artifact layer 120, and an element layer 110.

The configuration layer 140 can include a multitude of applications 145. Each application 145 can be a customized business process integration (BPI) solution that can be formed at least in part from a multitude of discrete application independent components referred to as artifacts. The artifacts can be used as building blocks for constructing the applications 145. In addition to artifacts, the applications 145 can include configuration data 142. The configuration data 142 can include application specific software routines. The configuration data 142 can also include a myriad of modifiable parameters for adjusting operational behavior of reusable software components. The modifiable parameters can adjust settings of the application specific software routines as well as the application independent artifacts used by the applications 145.

The template layer 130 can include a multitude of templates 135. Each template 135 can include a pre-constructed set of artifacts and artifact bindings that together represent a function. In addition to artifacts, the template 135 can include template data 132. The template data 132 can contain user selectable options associated with artifacts that must be filled before the functionality represented by the template 135 can be implemented. For example, the template data 132 can contain options for the particular adaptors necessary to convey the adaptive documents specified within the template 135 from one network location to another within a specified environment. The template data 132 can also contain template specific software routines that when combined with the artifacts enable the functionality of the template 135.

The artifact layer 120 can include a number of artifacts, which can be application independent software objects. Each artifact of the artifact layer 120 can be a semi-autonomous software unit driven by a set of application independent structures. Artifacts within the artifact layer 120 can be selected from a group of artifacts, which can include, but is not limited to, an adaptive document 121, a process flow 124, a screen flow 126, and an adaptor 128.

The adaptive document 121 can be a semi-autonomous software unit that encapsulates business data. The adaptive document 121 can have a well-defined lifecycle and exhibit variable behavior based upon different processing states. A processing state can be any state defined for finite state-machine software. Finite-state machine software can be any software that utilizes finite-state automata algorithms. Finite-state machine software is well known in the art of computer science and can include such software and software projects as the AT&T FSM Library™ by American Telephone and Telegraph (AT&T), Inc. of New York, N.Y., Grail+ by the Grail+ Project of the University of Western Ontario, AUTOMATA by Klaus Suter of Carnegie Mellon University, Unitex by Sébastien Paumier at the Institut Gaspard-Monge (IGM), and the like.

Whenever the adaptive document 121 is conveyed from one defined state to another, different functions and capabilities of the adaptive document can be activated. A different state can be defined for each different application that processes the adaptive document 121 resulting in application specific behavior. In one embodiment, multiple states can be defined within a single application causing the functionality and expression of the adaptive document 121 to vary within the same application as the adaptive document 121 enters the various defined states of the application.

The process flow 124 can be an artifact that coordinates the control of adaptive documents 121 from state to state and from application to application. Process flows 124 can detect system events and can responsively convey one or more adaptive documents 121 from one state to another. The process flow 124 can also initialize, suspend, delay, and terminate other process flows.

The screen flow 126 can model user interaction with an application utilizing the architecture 100. The user interaction can be based upon context-driven views. The screen flow 126 can also be used to generate graphical user interface (GUI) screen elements. While the screen flow 126 can be a generalized application independent artifact, the GUIs generated by the screen flow 126 can be specifically configured for the needs of discrete applications, thereby becoming application specific screen flows.

The adaptor 128 can be used to reconcile differences in data structures and to establish message conveyance protocols. More specifically, the adaptor 128 can be classified into a number of different functional types, such as a transport adaptor and a data adaptor. The transport adaptor can translate a message transportation protocol so that adaptive documents 121 and other BPI objects can be conveyed among various BPI applications in a network so that BPI transactions can be performed. The data adaptor can map data from one data structure to another.

The elements layer 110 can contain a number of different artifact independent elements, which can be used to construct the artifacts of the artifact layer 120. The element layer 110 can include a document 112, a screen 114, and a module 116. The document 112 can represent a particular electronic document or document template. The document 112 can include formatting and data information. In one embodiment, the document 112 can include data insertion fields that can be populated from data included within a data portion of an associated adaptive document 121. In a particular embodiment, when multiple documents 112 are associated with one adaptive document 121, each document 112 can represent the expression of the adaptive document 121 within a specified state.

The screen 114 can be a view, a view segment, and/or a view monitoring routine. A number of different screens 114 can be associated with a single screen flow 126, where different sets of screens 114 can correspond to different applications.

The module 116 can represent a discrete code module, procedure, method, or routine, which can be utilized by one or more of the artifacts in the artifact layer 120. Multiple modules 116 can form one or more libraries which can be utilized when constructing artifacts.

It should be noted that any of a variety of model driven business integration architectures based upon the architecture 100 can be generated by one of ordinary skill in the art; all of which are contemplated herein. For example, in one embodiment, the process flow 124 artifact and the screen flow 126 artifact can be combined into a single flow artifact containing functionality similar to that described. In another embodiment, the adaptor 128 artifact can be decomposed into more than one distinct artifact, such as a protocol adaptor artifact, a format adaptor artifact, and/or a data migration artifact. Similarly, details of the configuration layer 140, the template layer 130, the artifact layer 120, and element layer 110 can vary in relatively minor ways from specifics described above and still fall within the scope of the architecture 100.

Figure 2:
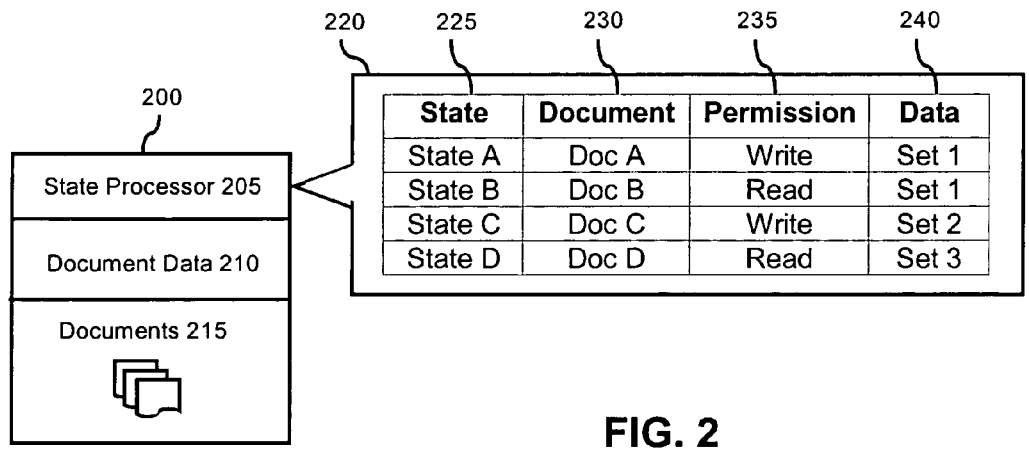
FIG. 2 is a schematic diagram illustrating an adaptive document in accordance with one embodiment of the inventive arrangements disclosed herein.

FIG. 2 is a schematic diagram illustrating an adaptive document 200 in accordance with one embodiment of the inventive arrangements disclosed herein. The adaptive document 200 can include a state processor 205, a document data 210 section, and one or more documents 215. The state processor 205 can include software routines configured to automatically adjust the behavior of the adaptive document 200 depending upon state in which the adaptive document 200 is disposed.

The document data 210 can encapsulate business data within the adaptive document 200. In one embodiment, the document data 210 can include a multitude of self describing data fields, such as database fields and/or extensible markup language (XML) fields. The documents 215 can include any of a variety of electronic documents or references to electronic documents. Each document 215 can include insertion points for the document data 210 as well as formatting instructions for data presentation.

In one embodiment, the adaptive document 200 can utilize one or more tables, such as table 220, to determine appropriate state dependent behavior. Table 220 can associate documents 215 and document data 210 with one or more states. More specifically, the table 220 can include columns for state 225, document 230, permission 235, and data 240. The state column 225 can specify state identification fields, each of which can be used as the primary key for the table 220. The adaptive document 200 can exhibit different behavior depending upon the value of the state in which it is disposed.

The document column 230 can specify fields for electronic documents. A different electronic document can correspond to different states for the adaptive document 200. For example, in State A, the adaptive document 200 can be expressed as Document A. In State B, the adaptive document can be expressed as Document B, and in State C, the adaptive document can be expressed as Document C. Accordingly, a single adaptive document 200 can represent multiple documents 200, each document 200 including data from a common set. Each document 200 can be differentially formatted for a particular purpose and/or application.

The permission column 235 can describe the state dependent access permission(s) that users of the adaptive document 200 are granted. For example, according to table 220, when the adaptive document 200 is in State A, write permission can be granted. In another example, the permission for State B can grant read only access to the adaptive document.

The data column 240 can specify a data set of the adaptive document 200 that is accessible when the adaptive document 200 is in a particular state. For example, when the adaptive document 200 is in State A or State B, Data Set 1 can be available. Similarly, when the adaptive document 200 is in State C, Data Set 2 can be available.

Figure 3:
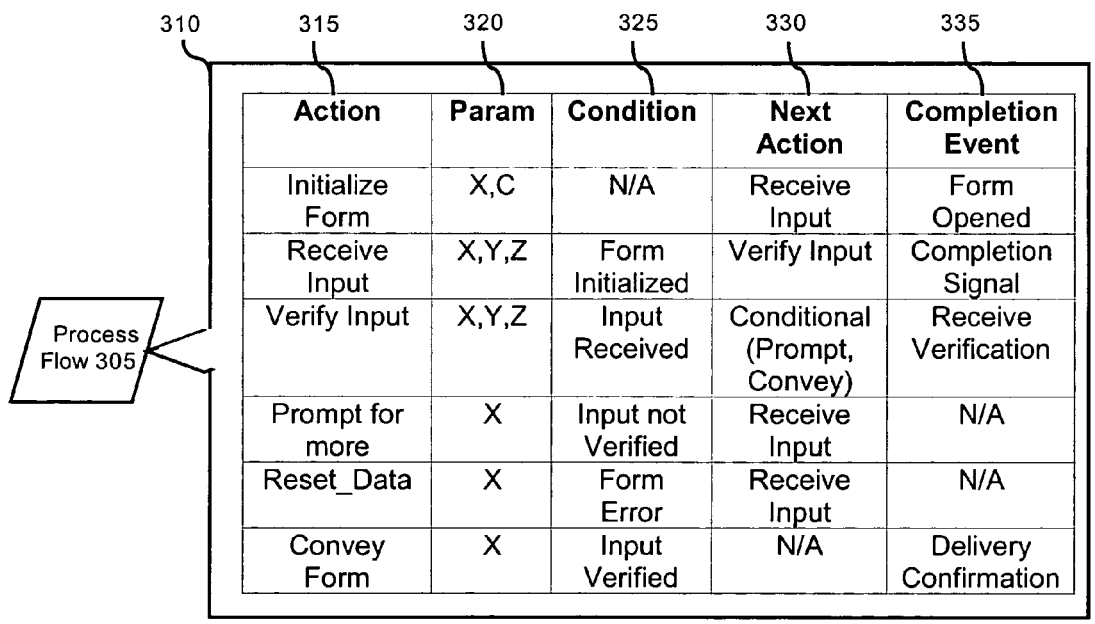
FIG. 3 is a schematic diagram illustrating a process flow in accordance with one embodiment of the inventive arrangements disclosed herein.

FIG. 3 is a schematic diagram illustrating a process flow 305 in accordance with one embodiment of the inventive arrangements disclosed herein. The process flow 305 can contain a set of activity nodes. Activity nodes can include one or more commands for altering adaptive document states. Activity nodes can also initiate the execution of one or more other process flows 305. Process flows 305 can, therefore, be nested within other process flows 305, thereby establishing a hierarchy of process flows. Each process flow 305 can include a terminal activity node, which can be a process ending activity node.

In one embodiment, the process flow 305 can utilize one or more tables, such as table 310. The table 310 can include a plurality of columns for storing different data fields. For example, the table 310 can include columns for action 315, parameter 320, condition 325, next action 330, completion event 335, and the like. The action 315 can be a key field uniquely identifying discrete activity nodes for the process flow 305. The action 315 can specify another process flow and/or an executable routine. Exemplary actions 315 can include an Initialize Form action, a Receive Input action, a Verify Input action, a Prompt For More action, a Reset Data action, and a Convey Form action.

The parameter column 320 can specify one or more parameters necessary for executing an associated action. Parameters can specify one or more adaptive documents, screen flows, states, user-selectable options, and the like. For example, Parameter "X" can specify a particular adaptive document that is manipulated by the process flow 305. In such an example, each action 315 can include Parameter "X" since each action 315 of table 310 can involve a manipulation of the same adaptive document.

The condition column 325 can specify preconditions necessary before a corresponding action 315 can be initialized. For example, a form initialization condition can be a precondition to receiving input. In another example, an input received condition can be a precondition to the Verify Input action.

The next action column 330 can specify one or more actions that can be initiated by the current action. The next action column 330 can also specify whether the initiated action/actions can be executed in parallel or in series, whether any execution delay exists, and other such action coordination specifics.

The completion event column 335 can describe a terminal condition and/or event that signify that an action has completed. For example, the completion event 335 for the Form Initialization action can be a Form Opened event. In another example, the completion event column 335 for the Receive Input action can be the receipt of a completion signal.

Figures 4, 5:
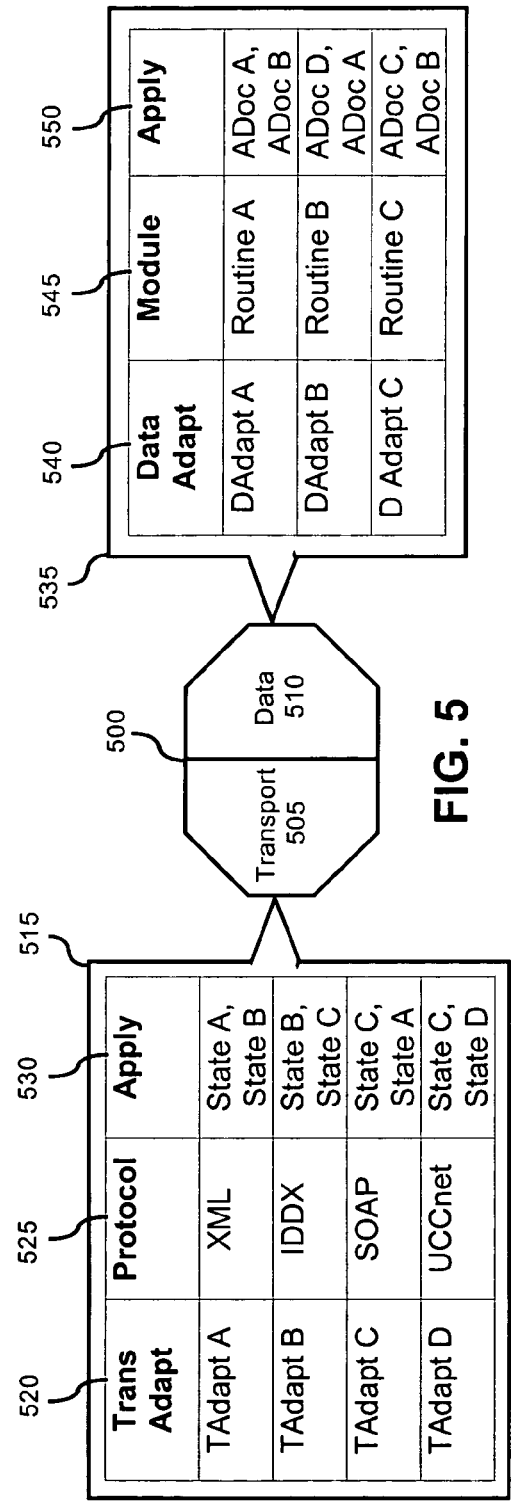
FIG. 4 is a schematic diagram illustrating a screen flow in accordance with one embodiment of the inventive arrangements disclosed herein.
FIG. 5 is a schematic diagram illustrating an adaptor in accordance with one embodiment of the inventive arrangements disclosed herein.

FIG. 4 is a schematic diagram illustrating a screen flow 400 in accordance with one embodiment of the inventive arrangements disclosed herein. The screen flow 400 can include coordination data 405, composition data 410, and one or more screens 415. Coordination data 405 can include information necessary to monitor activities of a specified interface as well as information necessary to present one or more graphical items within an interface.

The composition data 410 can include data presentation data for the screen flow 400. For example, the composition data 410 can specify the selection and placement of a number of different views for a particular state. The screens 415 can include objects or references to a view, view segment, embedded screen object, and the like. Screens 415 can be used by a corresponding screen flow 400 in a state dependent fashion.

In one embodiment, the screen flow 400 can utilize one or more tables, such as table 420. The table 420 can include columns for view 425, role 430, composition 435, flow 440, and the like. The view column 425 can include a key data field for a screen flow segment, where a screen flow segment can relate to view monitoring and/or view presentation. Exemplary views can include a Form Entry view, a Form Verification view, and a Form Approval view.

The role column 430 can specify permission restrictions for a view on a user or group basis. For example, the role of Supplier can have read permission on the Form Entry view while the role of Buyer can have read/write permission on the Form Entry view. In another example, the Supplier role can have update and execute permission on a Form Verification view.

The composition column 435 field can detail the various screen 415 components included within a view. For example, the Form Entry view can include the components of Screen 1, Screen 2, and Customer 1. In the example, Screen 1 can display buyer information, Screen 2 can display items that can be purchased, and Customer 1 can contain basic customer identification information, such as a postal address and/or a customer identification number.

The flow column 440 can specify data used to coordinate various views with one another. For example, once the Form Entry view has been presented, the Form Verification view can be initiated followed by a Form Approval view. In one embodiment, the flow column 440 can include conditional states. For example, when a form verification action indicates that a verification action is successful, the Form Approval view can be initiated. When, on the other hand, the form verification action indicates a verification event is not successful, a Form Entry view can be initiated so that data can be re-entered and another form verification action can be subsequently performed.

FIG. 5 is a schematic diagram illustrating an adaptor 500 in accordance with one embodiment of the inventive arrangements disclosed herein. Different types of adaptors can exist including a transport adaptor 505 and a data adaptor 510. The transport adaptor 505 can facilitate document conveyance across a network by translating messaging protocols. The data adaptor 510 can convert data from one format or data schema to another format.

In one embodiment, the transport adaptor 505 can utilize one or more tables, such as table 515. The table 515 can include columns for a transportation adaptor 520, a protocol 525, application settings 530, and the like. The transportation adaptor column 520 can specify identification fields for one or more transport adaptors 505. The protocol column 525 can specify fields for the protocol that a particular adaptor enables. The application settings column 530 can specify fields for the network nodes to which a particular transportation adaptor 505 applies. For example, the transportation adaptor 505 referred to as TAdapt A can utilize the XML protocol to convey messages between State A and State B. In another example, TAdapt C can utilize the Simple Object Access Protocol (SOAP) to convey messages between State C and State A.

In another embodiment, the data adaptor 510 can utilize one or more tables, such as table 535. The table 535 can include columns for a data adaptor 540, a module 545, application settings 550, and the like. The data adaptor column 540 can specify identification fields for one or more data adaptors 510. The module column 545 can specify software routines that are executed when mapping data from one data schema to another. The application settings column 550 can specify data schemas and/or documents. For example, according to table 535, DAdapt A can be a data adaptor 510 for mapping data from an adaptive document referenced as ADoc A to an adaptive document referenced by ADocB by executing Routine A. In another example, DAdapt B can be a data adaptor 510 for mapping data from ADoc D to an adaptive document referenced by ADoc A by executing Routine B.

Figure 6:
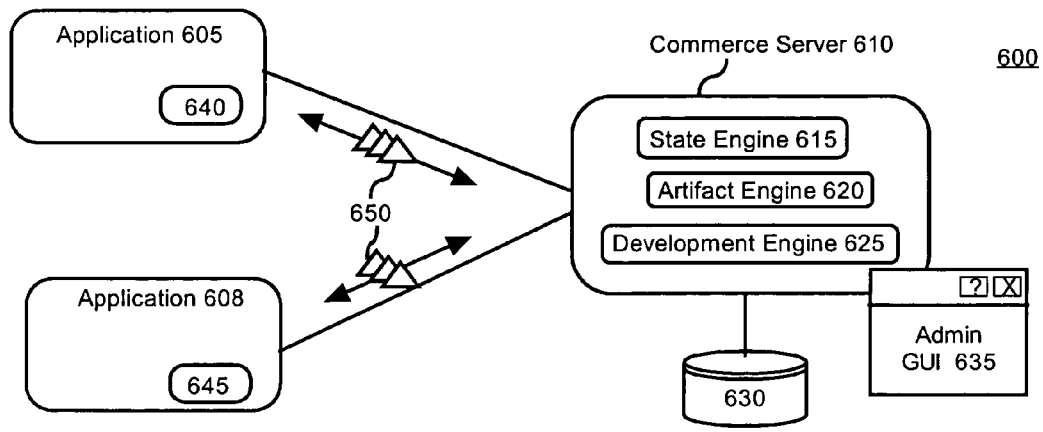
FIG. 6 is a schematic diagram illustrating a system for utilizing adaptive documents in accordance with one embodiment of the inventive arrangements disclosed herein.

FIG. 6 is a schematic diagram illustrating a system 600 for utilizing adaptive documents in accordance with one embodiment of the inventive arrangements disclosed herein. The system 600 can include an application 605, an application 608, and a commerce server 610, each of which can conform to the BPI architecture previously described herein. The application 605 can be a client application that can include a client side module 640 for handling artifacts 650. For example, the client side module 640 can present views provided by screen flows within a view enabled portal embedded within the application 605. The client side module 640 can present adaptive documents in a state dependent fashion. Further, the client side module 640 can react to one or more process flows. Similarly, the application 608 that includes client side module 645 can have functionality and structure similar to the functionality and structure detailed for application 605.

The commerce server 610 can be an electronic commerce server written in an application independent fashion that can manage numerous artifacts 650 used within electronic commerce transactions. That is, the commerce server 610 can process artifacts 650 and can coordinate interactions of the artifacts 650 among the applications 605 and 645. The commerce server 610 can include a state engine 615, an artifact engine 620, and a development engine 625.

The state engine 615 can manage a multitude of defined states. By defining different states and controlling these states via the state engine 615, the behavior of state dependent artifacts 650 can be dynamically altered in an application independent fashion. The artifact engine 620 can process different artifacts 650. Artifacts 650 can include adaptive documents, process flows, screen flows, and/or adaptors. The development engine 625 can provide authorized users with a variety of software development tools for constructing architecture compliant applications. The tools of the software development engine 625 can include artifact manipulation tools, graphical user interface (GUI) development tools, data integration tools, template application and construction tools, language toolkits and libraries, and the like.

In one embodiment, an administrative GUI 635 can be provided as an interface for authorized system administrators, software developers, software maintainers, and other authorized users. The administrative GUI 635 can access and manipulate the functions and capabilities of the commerce server 610. Additionally, the system 600 can include a server data store 630 where information needed by the commerce server 610 can be recorded and retrieved.

In operation, the application 605 can initialize a business commerce transaction. For example, the application 605 can be an item purchasing application. The client side module 640 can assure that any activities of the application 605 result in the generation and adjustment of appropriate artifacts 650. The artifacts 650 generated by the activities of the application 605 can be conveyed to the commerce server 610. The commerce server 610 can receive the artifacts 650, further process the artifacts 650, and convey new or modified artifacts 650 to the application 608, which can be an item supplying application. The application 608 can utilize the client side module 645 to process the received artifacts 650 in an appropriate fashion.

Figure 7:
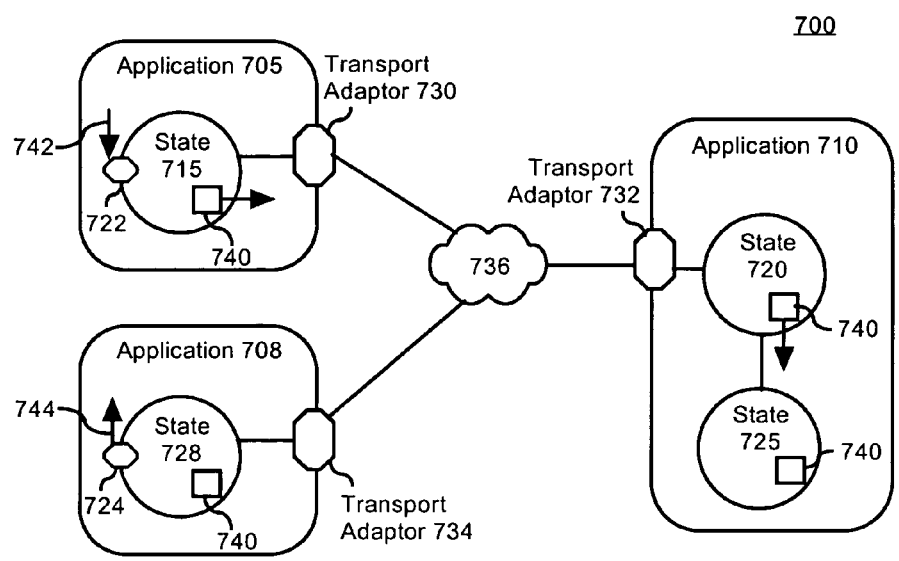
FIG. 7 is a schematic diagram illustrating a system for utilizing artifacts according to one embodiment of the inventive arrangements disclosed herein.

FIG. 7 is a schematic diagram illustrating a system 700 for utilizing artifacts according to one embodiment of the inventive arrangements disclosed herein. The system 700 can include application 705, application 708, and application 710, each of which adheres to the BPI architecture disclosed herein. In complying with the BPI architecture, a number of states can be defined. For example, state 715 can be defined for application 705, state 720 and state 725 can be defined for application 710, and state 728 can be defined for application 708. Adaptive document 740 can be conveyed between states 715, 720, 725 and 728. At each state, the behavior of the adaptive document 740 can be altered.

The system 700 can also include a number of adaptors, such as transport adaptors 730, 732, and 734 and data adaptors 722 and 724. The transport adaptors 730, 732, and 734 can be used to format messages using appropriate messaging protocols between different states so that the adaptive document 740 can be properly conveyed.

The data adaptors 722 and 724 can map data to/from an application specific schema from/to a general schema specified within the adaptive document 740. For example, in state

715, data can be inputted in accordance with a data schema unique to the application 705. Data adaptor 722 can map the inputted data from the schema of application 705 to a data schema specified by the adaptive document 740.

The system 700 represents a generalized BPI integration solution and can, therefore, be used to implement any of a variety of exemplary BPI transactions. For example, application 705 can represent an item distribution application tailored for a specific wholesaler; application 708 can represent an item purchasing application tailored for a retailer; and, application 710 can represent a product marketplace application. In one illustrative embodiment, the application 710 can be an industry-wide product synchronization database, such as the UCCnet GLOBALregistry™ from UCCnet, Inc. of Lawrenceville, N.J.

Using the above example, a wholesaler can access application 705 and input a new product that the wholesaler wishes to advertise within the UCCnet (represented by application 710). Initially, the product data 742 can be input in a manner specific to application 705. Once the data is entered, the application 705 can interface with a standardized module defined as state 715. As part of this interface, the product data 742 can be transformed by data adaptor 722 from a data schema specific to application 705 to a data schema specified for adaptive document 740.

A process flow can respond to a product data entry event and cause the adaptive document 740 to be conveyed to state 720 of the product marketplace represented by application 710. In order to convey adaptive document 740 to state 720, transport adaptors 730 and 732 can establish a communication link that complies with a specified messaging protocol. The adaptive document 740 can then be conveyed from state 715, to network 736, to state 720. In state 720, one or more processes can be performed against the adaptive document 740. For example, the product information within the adaptive document 740 can be verified and registered within the application 710. The application 710 can include more than one state, to which the adaptive document 742 can be conveyed and processes performed. For example, the adaptive document 740 can be conveyed to state 725 for further processing. Eventually, the product of the wholesaler can be registered with the product marketplace and made be viewable by a retailer using application 708.

If the retailer desires to purchase the item specified in adaptive document 740, a communication link can be established between state 728 and state 725 through which the adaptive document can be conveyed. In state 728, the adaptive document 740 can be transformed by data adaptor 724 from the general data schema to a data schema specific to application 708. Data 744 can then be extracted from the adaptive document 740 to be subsequently manipulated by the application 708 in an application specific fashion.

Figure 8:
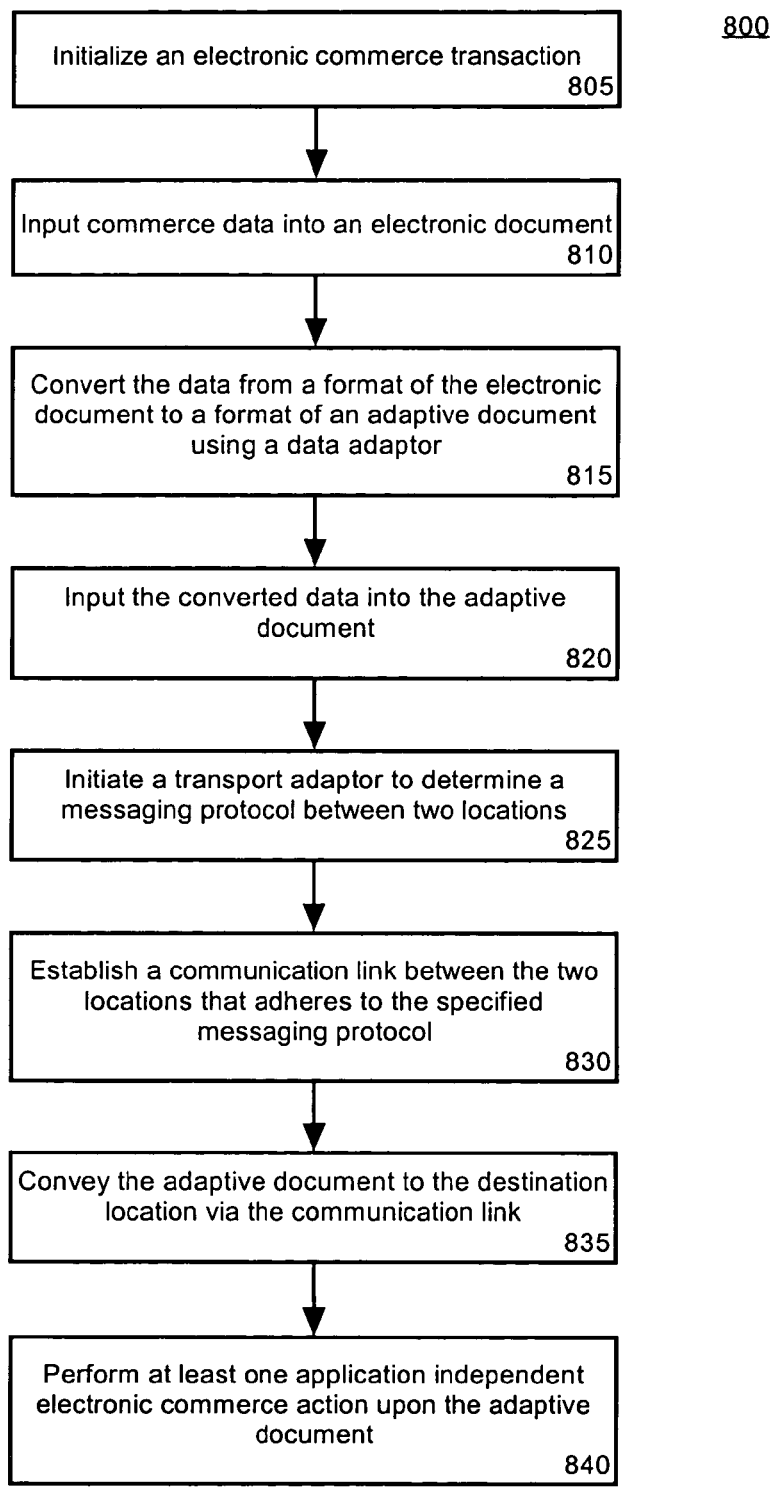
FIG. 8 is a flow chart illustrating a method for conducting an electronic commerce transaction in accordance with one embodiment of the inventive arrangements disclosed herein.

FIG. 8 is a flow chart illustrating a method 800 for conducting an electronic commerce transaction in accordance with one embodiment of the inventive arrangements disclosed herein. The method 800 can be performed in the context of software system for conducting electronic commerce transactions, where at least a portion of the system components adheres to the architecture described herein. The method 800 can begin in step 805, where an electronic commerce transaction can be initiated. The electronic commerce transaction can include a series of BPI tasks that involves two or more discrete business entities and/or business applications. In step 810, the initialization of the electronic commerce transaction can result in commerce data being inputted into an electronic document.

In step 815, the data can be converted from a format of the electronic document to a format of an adaptive document using a data adaptor. In step 820, the converted data can be inputted into the appropriate adaptive document. In step 825, a transport adaptor can be initiated to determine a messaging protocol between two locations, those locations being the current location of the adaptive document and the destination location for the adaptive document. In step 830, a communication link can be established between the two locations, where the communication link can adhere to the specified messaging protocol. In step 835, the adaptive document can be conveyed to the destination location via the communication link. In step 840, at least one application independent electronic commerce action can be performed upon the adaptive document.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method for conducting an electronic commerce transaction involving two or more discrete business entities and/or business applications comprising the steps of:

configuring a computer system including at least one processor and at least one storage medium by loading onto the storage medium a computer program having a plurality of code sections, the code sections executable by the processor for causing the computer to perform:

initializing the electronic commerce transaction involving the two or more discrete business entities and/or business applications, the electronic commerce transaction including a plurality of electronic commerce actions;

inputting commerce data into an electronic document;

converting the commerce data from a format of the electronic document to a format of an adaptive document using a data adaptor, wherein the adaptive document is a semi-autonomous software unit that encapsulates business data and exhibits variable behavior based upon different processing states, and wherein the data adapter reconciles data formats so that data can be exchanged between different applications;

inputting the converted commerce data into the adaptive document, wherein electronic commerce actions performed on the adaptive document are dependent upon a state of said adaptive document;

initializing a transport adaptor to determine a messaging protocol between a current location of the adaptive document and a destination location of the adaptive document, wherein the transport adaptor translates messages between messaging protocols used by different applications;

establishing a communication link between the current location of the adaptive document and the destination location of the adaptive document;

conveying said adaptive document to the destination location via the communication link; and performing at least one electronic commerce action upon said adaptive document, wherein said electronic commerce action utilizes application independent algorithms.

2. The method of claim 1, said performing step further comprising the step of:

altering a state of said adaptive document based upon instructions detailed within a process flow.

3. The method of claim 1, further comprising the steps of:

after said performing step, conveying said adaptive document to another location;

converting data within said adaptive document from a format of said adaptive document to a format of an electronic document; and presenting at least a portion of said electronic document containing said converted data within an application of said another location.

4. A machine-readable storage having stored thereon, a computer program having a plurality of code sections, said code sections executable by a machine for causing the machine to perform the steps of:

initializing the electronic commerce transaction involving the two or more discrete business entities and/or business applications, the electronic commerce transaction including a plurality of electronic commerce actions;

inputting commerce data into an electronic document;

converting the commerce data from a format of the electronic document to a format of an adaptive document using a data adaptor, wherein the adaptive document is a semi-autonomous software unit that encapsulates business data and exhibits variable behavior based upon different processing states, and wherein the data adapter reconciles data formats so that data can be exchanged between different applications;

inputting the converted commerce data into the adaptive document, wherein electronic commerce actions performed on the adaptive document are dependent upon a state of said adaptive document;

initializing a transport adaptor to determine a messaging protocol between a current location of the adaptive document and a destination location of the adaptive document, wherein the transport adaptor translates messages between messaging protocols used by different applications;

establishing a communication link between the current location of the adaptive document and the destination location of the adaptive document;

conveying said adaptive document to the destination location via the communication link; and performing at least one electronic commerce action upon said adaptive document, wherein said electronic commerce action utilizes application independent algorithms.

5. The machine-readable storage of claim 4, said performing step further comprising the step of:

altering a state of said adaptive document based upon instructions detailed within a process flow.

6. The machine-readable storage of claim 4, further comprising the steps of:

after said performing step, conveying said adaptive document to another location;

converting data within said adaptive document from a format of said adaptive document to a format of an electronic document; and presenting at least a portion of said electronic document containing said converted data within an application of said another location.

7. A computer-implemented system for conducting an electronic commerce transaction involving two or more discrete business entities and/or business applications comprising:

at least one memory; and at least one processor configured to:

initialize the electronic commerce transaction involving the two or more discrete business entities and/or business applications, the electronic commerce transaction including a plurality of electronic commerce actions;

input commerce data into an electronic document;

convert the commerce data from a format of the electronic document to a format of an adaptive document using a data adaptor, wherein the adaptive document is a semi-autonomous software unit that encapsulates business data and exhibits variable behavior based upon different processing states, and wherein the data adapter reconciles data formats so that data can be exchanged between different applications;

input the converted commerce data into the adaptive document, wherein electronic commerce actions performed on the adaptive document are dependent upon a state of said adaptive document;

initialize a transport adaptor to determine a messaging protocol between a current location of the adaptive document and a destination location of the adaptive document, wherein the transport adaptor translates messages between messaging protocols used by different applications;

establish a communication link between the current location of the adaptive document and the destination location of the adaptive document;

convey said adaptive document to the destination location via the communication link; and perform at least one electronic commerce action upon said adaptive document, wherein said electronic commerce action utilizes application independent algorithms.

8. The system of claim 7, wherein said adaptive document can be conveyed among a plurality of defined states, and wherein functionality of said adaptive document is dependant upon a state within which said adaptive document is disposed.

9. The system of claim 7, wherein said adaptive document can be conveyed from one defined state to another defined state in response to an occurrence of a system event.

10. The system of claim 7, wherein messaging protocols are adapted to facilitate a conveyance of the adaptive document across a network.

11. The system of claim 7, wherein data is mapped from one data structure to another data structure.

12. The system of claim 7, wherein interactions are modeled within interfaces associated with the electronic commerce transaction.

* * * * *